United States Patent
Fenney

(10) Patent No.: US 9,928,037 B2
(45) Date of Patent: Mar. 27, 2018

(54) MODULO CALCULATION USING POLYNOMIALS

(71) Applicant: Imagination Technologies Limited, Kings Langley (GB)

(72) Inventor: Simon Fenney, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 43 days.

(21) Appl. No.: 15/097,952

(22) Filed: Apr. 13, 2016

(65) Prior Publication Data

US 2016/0299743 A1 Oct. 13, 2016

(30) Foreign Application Priority Data

Apr. 13, 2015 (GB) .................................. 1506233.4

(51) Int. Cl.
*G06F 7/72* (2006.01)

(52) U.S. Cl.
CPC .............. *G06F 7/722* (2013.01); *G06F 7/724* (2013.01); *G06F 7/726* (2013.01); *G06F 7/727* (2013.01); *G06F 2207/72* (2013.01)

(58) Field of Classification Search
CPC .. G06F 7/72; G06F 7/724; G06F 7/726–7/727
See application file for complete search history.

(56) References Cited

U.S. PATENT DOCUMENTS

| 4,473,887 A * | 9/1984 | Odaka ..................... G06F 7/724 708/492 |
| 2005/0004967 A1 | 1/2005 | Becker |
| 2005/0010630 A1* | 1/2005 | Doering .............. H03M 13/093 708/490 |

FOREIGN PATENT DOCUMENTS

EP 1876523 A1 1/2008

* cited by examiner

*Primary Examiner* — Matthew Sandifer
(74) *Attorney, Agent, or Firm* — Vorys, Sater, Seymour and Pease LLP; Vincent M DeLuca

(57) ABSTRACT

Hardware logic arranged to perform modulo calculation with respect to a constant value b is described. The modulo calculation is based on a finite polynomial ring with polynomial coefficients in GF(2). This ring is generated using a generator polynomial which has a repeat period (or cycle length) which is a multiple of b. The hardware logic comprises an encoding block which maps an input number into a plurality of encoded values within the ring and a decoding block which maps an output number back from the ring into binary. A multiplication block which comprises a tree of multipliers (e.g. a binary tree) takes the encoded values and multiplies groups (e.g. pairs) of them together within the ring to generate intermediate values. Groups (e.g. pairs) of these intermediate values are then iteratively multiplied together within the ring until there is only one intermediate value generated which is the output number.

11 Claims, 3 Drawing Sheets

MODULO CALCULATION USING POLYNOMIALS

BACKGROUND

There are a number of known techniques for calculating the modulus of a number with respect to a constant (e.g. a mod b, where a and b are integers) in hardware logic. Such hardware logic may form part of a processor such as a CPU (Central Processing Unit) or GPU (Graphics Processing Unit). One example calculates the modulus as a by-product of an iterative division implementation (e.g. an iterative division which calculates a/b). However, where the value of 'b' is constant, it may be possible instead to use lookup tables and multiplexers (e.g. where a is not too large). Given the binary nature of most computer mathematics, calculations where the constant b is a power of two are trivial to perform and further, where b is a multiple of a power of 2, the calculation can be simplified by first performing the trivial division and modulus of the power of two factor and then recombining subsequently. The operation of calculating the modulus of a number with respect to a constant may be referred to as modulo (or modulus) calculation or the modulo operation.

In another known method which calculates the modulus of an n-bit number, a, with respect to an unsigned m-bit constant, b, each bit in number a, denoted a[i], is mapped to either 0 or $2^i \bmod b$ which gives n m-bit numbers (one for each bit in number a). The n m-bit numbers can then be added together in a logarithmic pairwise manner, with an optional subtract b (or a multiple of b) if the value of any addition is greater than b. This method is typically small (in terms of area of hardware logic required to implement it) but slow due to the use of additions and optional subtractions.

The embodiments described below are not limited to implementations which solve any or all of the disadvantages of known methods of implementing modulo calculation in hardware logic.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Hardware logic arranged to perform modulo calculation with respect to a constant value b is described. The modulo calculation is based on a finite polynomial ring with polynomial coefficients in GF(2). This ring is generated using a generator polynomial which has a repeat period (or cycle length) which is a multiple of b. The hardware logic comprises an encoding block which maps an input number into a plurality of encoded values within the ring and a decoding block which maps an output number back from the ring into binary. A multiplication block which comprises a tree of multipliers (e.g. a binary tree) takes the encoded values and multiplies groups (e.g. pairs) of them together within the ring to generate intermediate values. Groups (e.g. pairs) of these intermediate values are then iteratively multiplied together within the ring until there is only one intermediate value generated which is the output number.

A first aspect provides an apparatus comprising hardware logic arranged to perform modulo calculation, the hardware logic comprising: an encoding block arranged to map each bit in an n-bit input number to an encoded value within a finite polynomial ring, wherein the finite polynomial ring is defined by a generator polynomial; a multiplication block arranged to receive the encoded values and comprising a tree of multipliers arranged to multiply groups of values together within the finite polynomial ring in an iterative process to produce a single output value; and a decoding block arranged to receive the single output value from the multiplication block and map the single output value back from a value in the finite polynomial ring into binary.

A second aspect provides a computer readable storage medium having encoded thereon computer readable program code for generating a processor comprising hardware logic arranged to perform modulo calculation, the hardware logic comprising: an encoding block arranged to map each bit in an n-bit input number to an encoded value within a finite polynomial ring, wherein the finite polynomial ring is defined by a generator polynomial; a multiplication block arranged to receive the encoded values and comprising a tree of multipliers arranged to multiply groups of values together within the finite polynomial ring in an iterative process to produce a single output value; and a decoding block arranged to receive the single output value from the multiplication block and map the single output value back from a value in the finite polynomial ring into binary.

A third aspect provides computer readable storage medium having encoded thereon computer readable program code for generating a processor configured to perform a method comprising: receiving an input n-bit number; mapping each bit of the input n-bit number into a finite polynomial ring defined by a generator polynomial to generate n encoded values; multiplying groups of encoded values together within the finite polynomial ring using a tree of multipliers to generate a plurality of intermediate results; multiplying groups of intermediate results together within the finite polynomial ring using the tree of multipliers to generate a reduced number of intermediate results and repeating the multiplication until a single output result is generated; and mapping the single output result from the finite polynomial ring to binary.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software running on or controlling "dumb" or standard hardware, to carry out the desired functions. It is also intended to encompass software embodied in a non-transitory machine readable medium which "describes" or defines the configuration of hardware, such as HDL (hardware description language) software, as is used for designing semiconductor chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
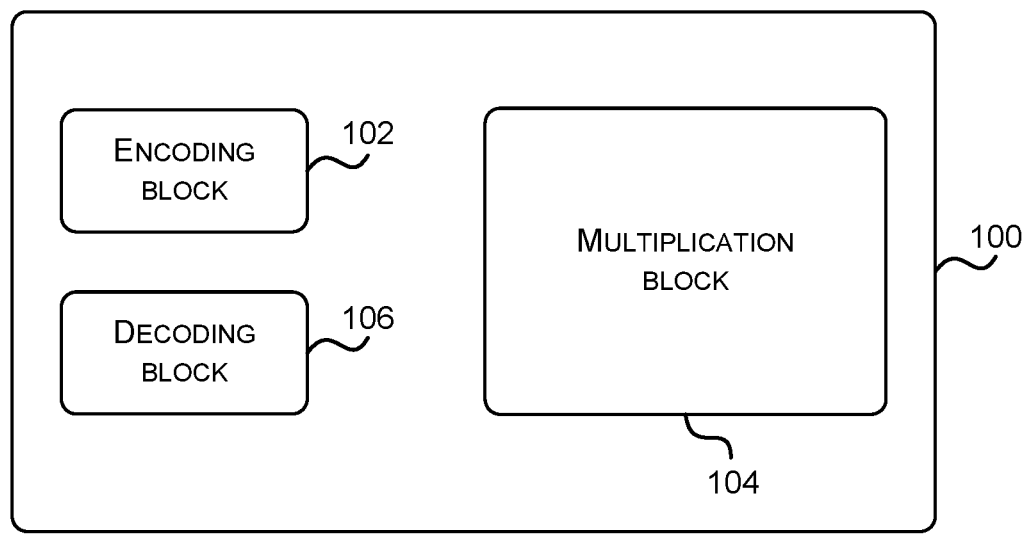
FIG. 1 is a schematic diagram of an example processor comprising hardware logic arranged to implement an efficient method of modulo calculation.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, existing hardware logic which calculates the modulus of an n-bit number with respect to an unsigned m-bit constant (where n and m are integers) is either small (in terms of area of hardware logic) but slow to perform the calculation or faster but larger in terms of area. There are many reasons why hardware logic is required which is arranged to calculate the modulus of an n-bit number, such as for calculating memory addresses for efficient memory storage of frame buffers with non-power of 2 dimensions/strides, efficiently mapping addresses/work to C known cache/processor units when C is not a power of 2 and unpacking symbols from a data stream where those symbols belong to a non-power of 2 alphabet.

An efficient method of modulo calculation for a given constant b is described below which uses polynomials to encode the n-bit number and then involves binary multiplication within a finite polynomial ring (i.e. within a field with a finite number of elements). The finite polynomial ring, $R_b$, has polynomial coefficients in GF(2) (a Galois field of two elements) and is generated by taking polynomials over GF(2) modulo a 'generator' polynomial, G(x), which has a repeat period (or cycle length) which is a multiple of b. The repeat period (or cycle length) of a polynomial, p, is the number of times that X can be multiplied by itself before repeating and examples are shown below.

It will be appreciated that GF(2) has members {0,1} with addition being XOR and multiplication being AND.

By using binary multiplication within a finite polynomial ring instead of binary addition, the overall size of the hardware logic is reduced and the hardware logic performs the calculation quickly. In particular, combining intermediate mod b values by multiplication in a finite polynomial ring requires less logic and/or introduces less delay than adding 2 binary values in [0,b-1] and optionally subtracting b. This is because the former involves no carries, and each bit of the multiplication answer can be done in parallel using XOR gates, whilst the latter involves waiting for carries and then selecting whether either the output or output-b via a multiplexer.

FIG. 1 is a schematic diagram of an example hardware unit 100 comprising hardware logic arranged to implement an efficient method of modulo calculation, i.e. calculation of a mod b where a is an n-bit number and b is an unsigned m-bit constant. The hardware unit may, for example, be a processor (e.g. a CPU or GPU) or a piece of dumb, non-programmable logic. The method is described in more detail below with reference to FIG. 2 which shows a flow diagram of an example method of modulo calculation using polynomials and which may be implemented in the hardware logic shown in FIG. 1.

The hardware logic within the processor 100 comprises an encoding block 102 of hardware logic arranged to map each bit of the input binary n-bit number, a, into a finite polynomial ring using exponentiation (e.g. using a look-up table or multiple look-up tables). It will be appreciated that the n-bits may be mapped individually or more than one bit may be mapped at the same time. The finite polynomial ring $R_b$ used is based upon a 'generator' polynomial G(x) which is itself selected based on the value of the constant b (where for the purposes of this description, the calculation performed is a mod b). As described above, the 'generator' polynomial, G(x), is selected to have a repeat period which is a multiple of b (e.g. kb, where k is a natural number).

It will be appreciated that there may be some situations where the methods described herein cannot be used as it may not be possible to create a practical generator polynomial with the right characteristics (e.g. although it is always theoretically possible to find a polynomial that has a repeat period which is a multiple of b—for example choosing $G(x)=x^b+1$ will trivially cycle after b steps—it may not be practical if the order of the polynomial, r, is significantly greater than $\log_2(b)$).

Figure 3:
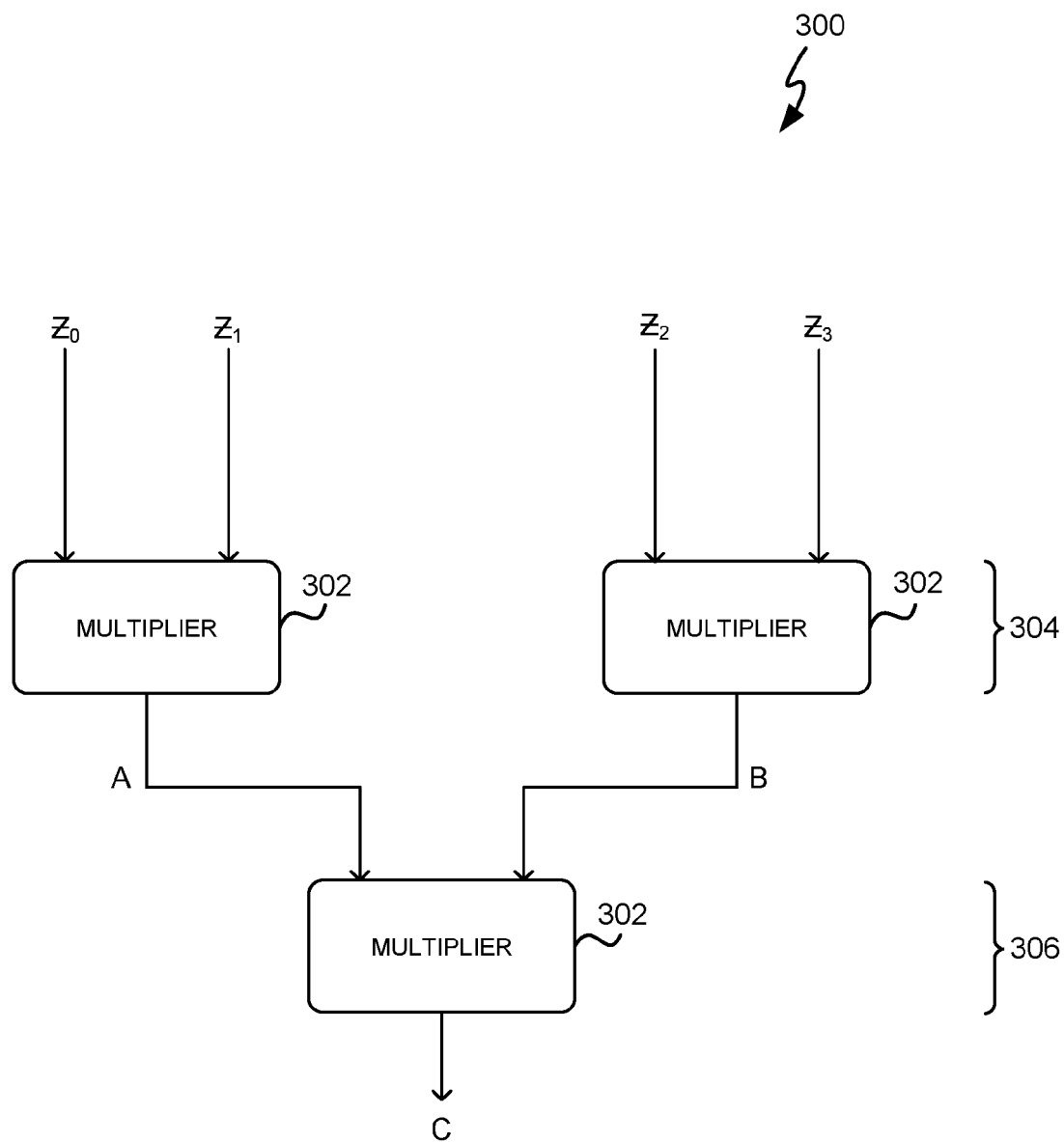
FIG. 3 is a schematic diagram of an example multiplication block which is suitable for use where n=4.

The hardware logic further comprises a multiplication block 104 which comprises a tree of multipliers. In many examples, the tree of multipliers comprises a binary tree of multipliers (which may or may not be a balanced binary tree) and is arranged to multiply pairs of numbers together in a number of stages. In other examples ternary operators may be used within the tree of multipliers. The structure of the multiplication block 104 is dependent upon the number of bits in the input binary number, i.e. on the value of n and an example for n=4 is shown in FIG. 3 and described below.

The multiplication (within multiplication block 104) is performed within the finite polynomial ring and this multiplication is particularly efficient because the "ripple" of carried numbers, which occurs in traditional multiplication, is avoided as the values will automatically wrap around and a simple XOR operation is carried out within columns. Additionally, the 'mod kb' operation is performed for "free" by the finite polynomial ring (where kb is the cycle length of the polynomial) and does not need to be performed as a separate operation (unlike when adding two binary numbers x,y in[0,b-1] where you must either (a) calculate x+y, check that x+y<b and otherwise subtract b or (b) calculate both x+y and x+y−b and choose the positive one using a multiplexer). If, for example, the finite polynomial ring comprises "b" elements, $a_1$ and $a_2$ are integers (in range 0 . . . b-1). Define $g_1=\text{Exp}(a_1)$, $g_2=\text{Exp}(a_2)$, then $\log(g_1 \ast g_2)=(a_1+a_2) \bmod b$.

The multiplication block 104 performs multiplication on the n encoded values output by the encoding block 102 (e.g. to generate $\lceil n/2 \rceil$ intermediate results). The block 104 then repeats the step in an iterative process, with each stage halving the number of intermediate values, to arrive at a single output value as described in more detail below.

In various examples, each multiplier within the multiplication block takes in 2 r-bit strings of 0,1s (where r is the order of the polynomial) and returns a single r-bit string of 0,1s. Each string refers to the values of the coefficients of monomials in an order r-1 polynomial. Multiplying the 2 input polynomials together and taking the resulting polynomial mod the 'generator' polynomial (and coefficients mod 2) will result in the output order r-1 polynomial, corresponding to the r bit string output. Since the multiplier is a polynomial multiplier mod 2 (also mod the generator polynomial) each bit can be calculated independently using XOR and AND gates (since these correspond to addition and multiplication in mod 2). This is shown in the detailed examples described below.

The hardware logic further comprises a decoding block 106 which is arranged to map the single output value from the multiplication block 104 (which is within the finite polynomial ring) back into binary using discrete logarithms (e.g. using an inverse look-up).

It will be appreciated that to increase clarity FIG. 1 shows only a subset of the elements within the hardware unit 100. For example, where the hardware unit is a processor it will typically comprise many additional elements such as registers, caches, execution pipelines, etc. Although the encoding block 102 and decoding block 106 are shown in FIG. 1 as separate elements, in some examples, the two may be combined into a single block of hardware logic which is arranged to perform both the encoding and decoding operations.

The method of modulo calculation implemented by the hardware logic described above and shown in FIG. 1 can be described in more detail with reference to the flow diagram in FIG. 2 and two worked examples. In both worked examples, the modulo calculation is with respect to a constant value, b=7 and the input number a is a 4-bit number (i.e. n=4).

An input to the modulo calculation (and hence to the encoding block 102) is a n-bit number, a 202. Each of these n-bits are mapped into a finite polynomial ring using a look-up table (block 204) to produce n encoded values 206. In various examples, multiple bits (e.g. pairs of bits) may be encoded at the same time. As described above, the finite polynomial ring is based upon a polynomial referred to as the 'generator' polynomial and this polynomial is selected based on the constant, b (where the modulo calculation performed is modulo b). The selection of the 'generator' polynomial is described in more detail below. For purposes of the two worked examples, the 'generator' polynomial $X^3+X^2+1$ may be used and this may be represented in binary as 1101, with each bit indicating the presence (by a 1) or the absence (by a 0) of a term in the polynomial. More generally, the example 'generator' polynomial which defines the finite polynomial ring has the form $$G(x) = x^j + b_{j-1}x^{j-1} + \ldots + 1$$

where $b_i \in [0,1]$ (i.e. the coefficients are calculated mod 2, such that 2≡0) and the binary representation is $1b_{j-1}\ldots b_1 1$ (note that the values of $b_j$ and $b_0$ are always equal to one).

For a more concrete example, consider an example hardware unit that computes "A mod 7", where A is a 12-bit number (n=12). In this example, the polynomial $G_{ex}=X^3+X^2+1$, $b_3=1$, $b_2=1$, $b_1=0$, $b_0=1$ will be used. In the ring, we define G to be congruent to 0, which, for the example, implies $X^3 \equiv X^2+1$. As this example polynomial G is an order 3 polynomial, any polynomial, P(x) taken modulo G can be made order 2 or lower and can therefore be represented as 3 bits, one for each coefficient (0 or 1).

An integer, j, is mapped to the polynomial $P_j(x)=x^j$ mod G. This may be done using a look-up table and a part of an example look-up table for the example polynomial is as shown in the first and fifth columns of the table below, with the second and third columns providing intermediate steps for purposes of explanation only and the fourth column showing equations further explaining how the mapping is calculated:

| Binary input | Decimal equivalent | $x^j$ | $P_j(x) = x^j$ mod G | Finite ring encoding |
|---|---|---|---|---|
| 000 | 0 | $X^0$ | $X^0 = 1$ ∴0.001 | 001 |
| 001 | 1 | $X^1$ | $X^1 = X$ ∴0.010 | 010 |
| 010 | 2 | $X^2$ | $X^2 = X^2$ ∴100 | 100 |
| 011 | 3 | $X^3$ | Since $X^3 + X^2 + 1 \equiv 0$ and $1 \equiv -1$ $X3 \equiv -(X^2 + 1) \equiv X^2 + 1$ ∴101 | 101 |
| 100 | 4 | $X^4$ | Using the equation above for $X^3$: $X^4 = X \cdot X^3 = X(X^2 + 1) = X^3 + X = X^2 + X + 1$ ∴111 | 111 |
| 101 | 5 | $X^5$ | Using the equations above for $X^4$ & $X^3$: $X^5 = X \cdot X^4 = X(X^2 + X + 1) = X^3 + X^2 + X = 2X^2 + X + 1 = X + 1$ ∴011 | 011 |
| 110 | 6 | $X^6$ | Similarly: $X^6 = X \cdot X^5 = X(X + 1) = X^2 + X$ ∴110 | 110 |
| 111 | 7 | $X^7$ | $X^7 = X \cdot X^6 = X(X^2 + X) = X^3 + X^2 = 2X^2 + 1 = 1$ ∴001 | 001 |
| 1000 | 8 | $X^8$ | As $X^7 \equiv 1, X^8 \equiv .010$ etc. | 010 |
| 1001 | 9 | $X^9$ | etc | 100 |

It can be seen from the table above that the example polynomial repeats with a period of 7 as $X^7 \equiv X^0 \equiv 1$. More generally, as described above, the repeat period (or cycle length) of a polynomial, p, is the number of times that X can be multiplied by itself before repeating. As a result of the repeat in the above example, $X^7 \equiv 1$, $X^8 \equiv X$, $X^9 \equiv X^2$, etc. or more generally, $X^Z \equiv X^{k(Z \bmod b)}$.

The mapping of each of the n-bits into the finite polynomial ring (in block 204) outputs up to n encoded values 206. An example which encodes each of the n-bits independently behaves as follows: For each input bit, $l_i$, $i \in \{0 \ldots n-1\}$, representing the binary position, $2^i$, a lookup function of the following form is used $$f_i(l_i) = \text{if} \begin{cases} l_i = 0 & x^0 \\ l_i = 1 & x^{k(2^i \bmod b)} \bmod G \end{cases}$$

and the resulting, polynomial expression is represented using a bit per polynomial coefficient encoding.

In the example above with the polynomial $G_{ex}=X^3+X^2+1$ each of these n encoded values 206 is a 3-bit value. Specifically, to determine the mapping for, input bit, $l_8$, for example, using the mapping above (and assuming k=1):

$$2^8 \bmod 7 = 4$$

$$x^4 \bmod G = X^2 + X + 1$$

$$x^0 = 1$$

Therefore bit $l_8$ is mapped to the 3-bit pattern "$l_8 l_8 1$", i.e. if $l_8=0$, then "001" is generated, else, "111" is output.

The encoded values 206 are then multiplied together (as polynomials) in pairs (in the multiplication block 104) to produce a smaller number of intermediate results 210 (block 208), e.g. $\lceil n/2 \rceil$ intermediate results 210 in the first iteration. For the examples above where n=4, the first multiplication stage (a first iteration of block 208) outputs two intermediate results 210, which may be denoted A and B.

A concrete example of polynomial multiplication (over GF(2)) modulo the example polynomial, G, will be given. Consider the multiplication, C=A*B, for inputs $A=A_2A_1A_0$ and $B=B_2B_1B_0$. Performing 'long hand' expansion of A*B (mod G) obtains:

|   |   | $A_2$ | $A_1$ | $A_0$ |
|---|---|---|---|---|
|   | × | $B_2$ | $B_1$ | $B_0$ |
|   |   | $B_0A_2$ | $B_0A_1$ | $B_0A_0$ |
| + |   | $B_1A_2$ | $B_1A_1$ | $B_1A_0$ |   |
| + | $B_2A_2$ | $B_2A_1$ | $B_2A_0$ |   |   |
|   | $T_4$ | $T_3$ | $T_2$ | $T_1$ | $T_0$ |

Noting that $T_4$ is equivalent to '111' and T3, '101', provides a final result of:

$$C_2=(T_4+T_3)+T_2 \quad C_1=T_4+T_1 \quad C_0=(T_4+T_3)+T_0$$

It will be appreciated that, for the first set of multipliers of 208, the inputs 206 to the multipliers may be of a trivial form (e.g. be either constants or dependent on a single variable) in which case, for one skilled in the art, it may be very simple to reduce the above multiplier logic. In an alternative example, it can be beneficial to encode, not just individual input bits, but several bits at a time. For example, encoding the first three, least significant input bits of input could be done with a lookup table of the form:

| Input bits | Encoded bits |
|---|---|
| 000 | 001 |
| 001 | 010 |
| 010 | 100 |
| 011 | 101 |
| 100 | 111 |
| 101 | 011 |
| 110 | 110 |
| 111 | 001 |

If necessary, such a lookup table can easily be synthesised into logic using off-the-shelf tools.

If there is only a single intermediate result output from the first stage of the multiplication (in block 208), then there is no need to perform further multiplication ('Yes' in block 212) and the method can proceed to decode that result (in block 216). If however, there is more than one intermediate result output from the first stage ('No' in block 212), the intermediate results are fed as inputs into a second stage of multiplication (i.e. block 208 is repeated) which multiplies together pairs of the input numbers (which in this case are the intermediate results from the previous stage) to produce a yet smaller number of intermediate results 210, e.g. $\lceil (\lceil n/2 \rceil/2) \rceil$ intermediate results 210 in a second iteration. For the examples above where n=4, a second stage of multiplication results in a single intermediate result 210, which may be denoted C. This means that there is no need for a further iteration of multiplication ('Yes' in block 212), but for other values of n (e.g. n>4), additional multiplication stages will be used (i.e. block 208 will be repeated one or more additional times) until a single intermediate result 210 is obtained.

FIG. 3 is a schematic diagram of an example multiplication block 300 which is suitable for use where n=4. The block 300 comprises a binary tree of multipliers 302 arranged in two stages 304, 306. In the first stage 304, pairs of the encoded values 206, denoted $Z_0$–$Z_3$, are multiplied together using two multipliers 302 to produce two intermediate results 210, A and B where $Z_0 \cdot Z_1$=A and $Z_2 \cdot Z_3$=B. In the second stage 306, a single multiplier 302 is used to produce a single intermediate result 210, C, where A·B=C. As the multiplication is performed within the finite polynomial ring, the intermediate results 210 (e.g. A, B, C) in the examples described are all 3-bit values (like the encoded values 206, $Z_0$–$Z_3$).

Each of the multipliers 302 performs multiplication within the finite polynomial ring defined by the selected polynomial, e.g. $X^3+X^2+1$ in the examples described above. Using this example polynomial with a 4-bit input number, the operation of a multiplier 302 in the first stage 304 can be described in more detail. For the purposes of this description, the 3-bits in the 4 encoded values 206 (one for each of the 4-bits in the input number) are represented as follows: $Z_0=Z_{02}Z_{01}Z_{00}$, $Z_1=Z_{12}Z_{11}Z_{10}$, $Z_2=Z_{22}Z_{21}Z_{20}$ and $Z_3=Z_{32}Z_{31}Z_{30}$ and the 3-bits in the intermediate results 210 are represented similarly: $A=A_2A_1A_0$, $B=B_2B_1B_0$ and $C=C_2C_1C_0$.

The operation performed by the one of the multipliers 302 in the first stage 304 is $(Z_0 \cdot Z_1)=(Z_{02}Z_{01}Z_{00})(Z_{12}Z_{11}Z_{10})$ and this is equivalent to multiplying together the polynomials $(Z_{02}X^2+Z_{01}X+Z_{00})(Z_{12}X^2+Z_{11}X+Z_{10})$ whilst taking mod 2 of the coefficients (i.e. the coefficients have the value 0 or 1) and taking the modulus with the polynomial defining the finite polynomial ring, $X^3+X^2+1$. This multiplication is shown below:

| $X^2$ coefficients | $X^1$ coefficients | $X^0$ coefficients |   |
|---|---|---|---|
| $Z_{00}Z_{12}$ | $Z_{00}Z_{11}$ | $Z_0Z_{10}$ |   |
| $Z_{01}Z_{10}$ | $Z_{01}Z_{10}$ |   |   |
| $Z_{01}Z_{12}$ |   | $Z_{01}Z_{12}$ | *** |
| $Z_{02}Z_{10}$ |   |   |   |
| $Z_{02}Z_{11}$ |   | $Z_{02}Z_{11}$ | *** |
| $Z_{02}Z_{12}$ | $Z_{02}Z_{12}$ | $Z_{02}Z_{12}$ | *** |
| $A_2$ | $A_1$ | $A_0$ |   |

Within each column, the values of $A_2$, $A_1$ and $A_0$ are determined using an XOR operation on the coefficients in the column.

The rows marked * result from taking the modulo with respect to the polynomial defining the finite polynomial ring (e.g. $X^3+X^2+1$) and this keeps the width of each intermediate result at 3-bits (i.e. the same as the input values). The first and second rows marked * map an $X^3$ coefficient (1000) to $X^2$ and $X^0$ coefficients since 1000≡101 within the finite polynomial ring and the third row marked *** maps an $X^4$ coefficient (10000) to $X^2$, $X^1$ and $X^0$ coefficients since 10000≡111 within the finite polynomial ring.

It can be seen from the example above that for a finite polynomial ring defined by $X^3+X^2+1$, multiplication within the finite polynomial ring (as performed by each multiplier 302) is a logic function that takes in 6 bits (e.g. $Z_{02},Z_{01},Z_{00}, Z_{12},Z_{11},Z_{10}$ and outputs 3 bits (e.g. $A_2,A_1,A_0$).

Having performed the multiplication (in one or more iterations of block 208), the single output value 214 (as output by the multiplication block 104) is mapped back into binary (in the decoding block 106) using an inverse look-up (block 216). This can use an "r bit to ceiling(log2(b)) bits" look up table (LUT) to do the inverse/discrete logarithm (in block 216). The LUT can be implemented as a combinatorial circuit using logic minimisation algorithms known in the art, such as Quine-McKluskey or Espresso. There will be a number of "don't care" cases which can be used to reduce the cost of the LUT. For the special cases of polynomials of the form $G(x)=x^b+1$, the inverse is relatively trivial, requiring only OR gates.

Figure 2:
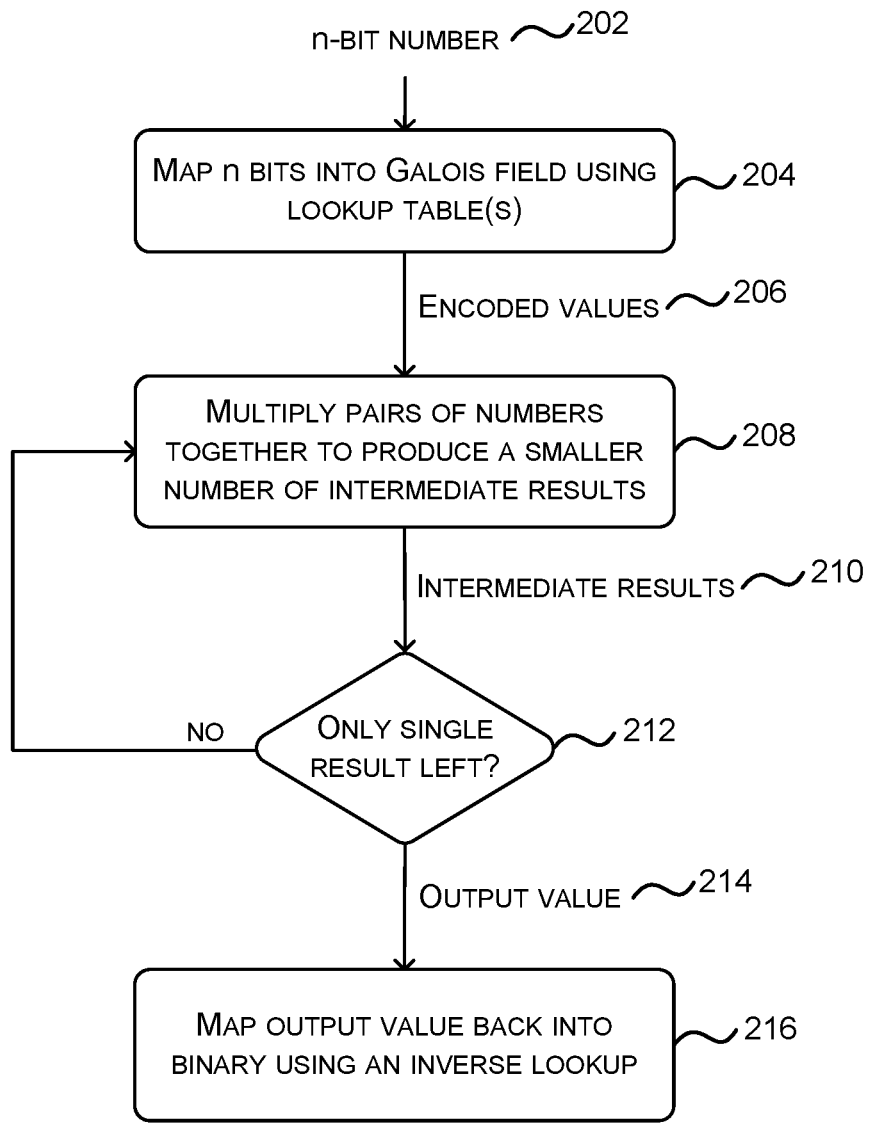
FIG. 2 is a flow diagram of a method an example method of modulo calculation using polynomials.

The method shown in FIG. 2, performed by the hardware logic shown in FIG. 1 for n=4 and b=7 and described above can be written as:
Input 4-bit number 202: $Y = \sum_{i=0}^{3} Y_i 2^i$, $Y_i = 0,1$ $$Y \bmod 7 = \left( \sum_{i=0}^{3} (Y_i 2^i) \bmod 7 \right) \bmod 7$$

Map to finite polynomial ring (block 204) to create encoded values 206:
$$X^{(\sum_{i=0}^{3} (Y_i 2^i) \bmod 7) \bmod 7}$$

But this can be re-written as we take the polynomial modulo $X^3+X^2+1$ giving:
$$X^{\sum_{i=0}^{3} Y_i 2^i}$$

Therefore:

$$Y \bmod 7 = \prod_{i=0}^{3} X^{Y_i 2^i}$$
$$= \left( X^{Y_0 2^0} \cdot X^{Y_1 2^1} \right) \cdot \left( X^{Y_2 2^2} \cdot X^{Y_3 2^3} \right)$$
$$= (Z_0 \cdot Z_1) \cdot (Z_2 \cdot Z_3)$$
$$= A.B$$
$$= C$$

The method shown in FIG. 2 and performed by the hardware logic shown in FIG. 1 can be demonstrated using the example polynomial from above (e.g. $X^3+X^2+1$) in two worked examples:
Example 1: Y=10 mod 7 (in decimal)
4-bit input number (in binary)=1010
Encoded values 206: $X^{2^3}=010$, $X^0=001$, $X^{2^1}=100$, $X^0=001$ Multiplication (block 208): (010.001).(100.001)

= 010.100

= 101 (output value 214)

Decoded value is therefore 011 in binary, 3 in decimal which is correct as 10 mod 7=3.
Example 2: Y=15 mod 7 (in decimal)
4-bit input number (in binary)=1111
Encoded values 206: $X^{2^3}=010$, $X^{2^2}=111$, $X^{2^1}=100$, $X^{2^0}=010$ Multiplication (block 208): (010.111).(100.010)

= 011.100 (as 010.111 = 1110 ≡ 011 within the finite polynomial ring)

= 010 (output value 214, as 011.101 =

1111 ≡ 010 within the finite polynomial ring)

Decoded value is therefore 001 in binary, 1 in decimal which is correct as 15 mod 7=1.

In the examples above a polynomial $G=X^3+X^2+1$ is used to define a finite polynomial ring which is then used in modulo calculation with respect to a constant value of 7. As described above, this polynomial has coefficients which are either 0 or 1 (i.e. the coefficients are modulo 2) and has a repeat period (or cycle length) of 7 and so in the examples above, a polynomial G has been selected where the repeat period (or cycle length) is equal to the constant used in the modulo calculation.

Any 'generator' polynomial G may be used in the method of modulo calculation described above which has coefficients equal to 0 or 1, is of order ≥1 and which is not divisible by X. Which polynomials are suitable for any particular modulo calculation, a mod b, depends on the value of the constant b. A polynomial with a repeat period (or cycle length), p, is suitable for calculation of a mod b, where p=kb and k is a natural number. In many examples, a polynomial G is used where k=1 such that the repeat period matches the constant used in the modulo calculation (p=b), i.e. where the modulo calculation performed is a mod p.

The following description relates to additional criteria which may, in some examples, be used to select the generator polynomial, G. As described above, these additional criteria do not need to be used and any polynomial which meets the criteria set out in the previous paragraph may alternatively be used.

In various examples, the generator polynomial, G, may also be chosen so that $R_b$ has N+1 elements, where N=kb (i.e. N is a multiple of constant b) and such that raising a certain chosen element of the finite polynomial ring $R_b$ (e.g. the polynomial $x^1$) to successive integer powers will cycle through N unique values before returning to the start. The remaining element in $R_b$ (in addition to the N unique values) is 0.

A polynomial may, in various examples, additionally be selected based on the order of the polynomial and the number of non-zero terms in the representation. In the examples above, $G=X^3+X^2+1$ which is an order 3 polynomial and results in a 3 bit representation. In various examples, a polynomial may be selected according to one or both of the following criteria:

a lowest order polynomial, where the polynomial is at least of order $\lceil \log_2(p) \rceil$, and a small number of non-zero terms in the polynomial.

In another example, the hardware logic may be arranged to compute modulo 3 of an n-bit number and two suitable polynomials over GF(2) are shown in the table below:

| Polynomial | Cycle Length, p | Number of terms | Order of the polynomial, r |
|---|---|---|---|
| $X^2 + X + 1$ | 3 | 3 | 2 |
| $X^3 + 1$ | 3 | 2 | 3 |

It can be seen from the table above that both polynomials have coefficients which are 0 or 1, are of order≥1 and are not divisible by X and can be used in the calculation of modulo 3 because they have a suitable cycle length (p=3). However, despite using a more redundant representation the second polynomial provides a more efficient implementation for two reasons. Whenever a polynomial, G, is of the form $X^P+1$, the "XOR" addition operations in the multipliers can be replaced with much smaller 'OR' gates, because exactly one product will be non-zero. Further, the decoding logic in 216 for such polynomials is very simple. However, since the number of bits for such polynomials increases linearly with p, rather than sub-linearly, they are not suited to larger values of p. These polynomials of the form $X^P+1$ may be considered particularly efficient special cases for smaller values of b.

In some examples where $b=2^k-1$, (e.g. for some values of k), a maximal polynomial of order r=k may be used. A 'maximal polynomial' of order r, defines a Galois field where the field element x has the maximal cycle length $2^r-1$ (e.g. the size of the field minus 1). This means that the r bit intermediate results can take any value except all 0s, so it has optimal size efficiency (small design) and there is only one wasted state. For example, $X^2+X+1$ is a maximal polynomial for r=2.

In a further example, the hardware logic may be arranged to compute modulo 5 of an n-bit number and three suitable polynomials are shown in the table below:

| Polynomial | Cycle Length, p | Number of terms | Order of the polynomial, r |
|---|---|---|---|
| $X^4 + X^3 + X^2 + X + 1$ | 5 | 5 | 4 |
| $X^5 + 1$ | 5 | 2 | 5 |
| $X^4 + X + 1$ | 15 | 3 | 4 |

It can be seen from the table above that both polynomials have coefficients which are 0 or 1, are of order ≥1 and are not divisible by X and can be used in the calculation of modulo 5 because they have a suitable cycle length (p=k5). However, using the second polynomial may provide a more efficient implementation because again it represents the special case described above.

The polynomial which is selected for use in performing the modulo calculation directly impacts the arrangement of the hardware logic used (e.g. the arrangement of the hardware logic shown in FIG. 1). This is because the polynomial defines the look-up table used by the encoding block 102 and the decoding block 106 and also defines the finite polynomial ring in which the multiplication is performed within the multiplication block 104.

As described above, polynomials of the form $X^P+1$ may be considered particularly efficient special cases for smaller values of b. A variation of these are polynomials of the form $X^b+1$. Where polynomials of this form are used, each bit in number a, denoted a[i], is mapped to either 1 or $2^{2^i \bmod b}$ which gives n b-bit values (in encoding block 102). These values are then combined pairwise in a logarithmic manner using multiplexers (in multiplication block 104) to map $2^i$ and $2^j$ to $2^{(i+j) \bmod b}$ with a final lookup stage (in decoding block 106) to map the output back to a corresponding [0, b-1] value using a lookup table.

The hardware logic described above and shown in FIG. 1 performs modulo calculation with respect to a constant value quickly and occupies a small area (e.g. of silicon) within a hardware unit. In particular, the multiplication block 104 is very compact compared to alternative logic which uses adders (and optional constant subtraction of b) instead of multipliers and although the method described herein additionally requires an encoding block 102 and a decoding block 106, this does not adversely impact the overall operational efficiency because of the significant efficiencies made in the multiplication block 104.

For purposes of reference, the following parameters are used in the description above:
 b is the constant with respect to which the modulo calculation is performed
 m is the number of bits in b
 a is the input number
 n is the number of bits in the input number, a
 k is a natural number
 N is the number of non-zero values in the finite polynomial ring $R_b$ and may be a multiple of b (N=kb), although in some examples N≠kb
 r is the order of the generator polynomial
 p is the repeat period of the generator polynomial.

The term 'processor' and 'computer' are used herein to refer to any device, or portion thereof, with processing capability such that it can execute instructions. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. An apparatus comprising hardware logic arranged to perform modulo calculation, the hardware logic comprising:
   an encoding block configured to receive an n-bit input number and map each bit in the n-bit input number to an encoded value within a finite polynomial ring, wherein the finite polynomial ring is defined by a generator polynomial;
   a multiplication block configured to receive the encoded values mapped by the encoding block and to multiply groups of values together within the finite polynomial ring in an iterative process to produce a single output value; and
   a decoding block configured to receive the single output value from the multiplication block and map the single output value back from a value in the finite polynomial ring into a binary value to be further processed by the apparatus.

2. An apparatus according to claim 1, wherein the generator polynomial comprises coefficients equal to one or zero, is of order greater than one and is not divisible by X, where X is a coefficient of the generator polynomial.

3. An apparatus according to claim 1, wherein the modulo calculation is performed with respect to a constant value, b, and the generator polynomial has a repeat period, p, equal to a multiple of b.

4. An apparatus according to claim 3, wherein the generator polynomial has a repeat period, p, equal to the constant value, b.

5. An apparatus according to claim 3, wherein the generator polynomial is selected from a set of candidate generator polynomials, each candidate generator polynomial having a repeat period equal to a multiple of b, and wherein the selection is based on at least one of: a number of terms in the generator polynomial and an order of the generator polynomial.

6. An apparatus according to claim 3, wherein the generator polynomial is $X^p+1$.

7. An apparatus according to claim 3, wherein the generator polynomial is $X^b+1$.

8. An apparatus according to claim 1, wherein at least one of the encoding block and the decoding block uses a look-up table and wherein the contents of the look-up table are dependent upon the generator polynomial.

9. An apparatus according to claim 1, wherein each multiplier within the multiplication block is arranged to receive two r-bit strings, where r is an order of the polynomial, and output a single r-bit string.

10. A non-transitory computer readable storage medium having stored thereon a computer readable dataset description of an integrated circuit that, when processed, causes a processing system to generate a processor comprising hardware logic arranged to perform modulo calculation, the hardware logic comprising:
    an encoding block configured to map each bit in an n-bit input number to an encoded value within a finite polynomial ring, wherein the finite polynomial ring is defined by a generator polynomial;
    a multiplication block configured to receive encoded values mapped by the encoding block and to multiply groups of values together within the finite polynomial ring in an iterative process to produce a single output value; and
    a decoding block configured to receive the single output value from the multiplication block and map the single output value back from a value in the finite polynomial ring into a binary value.

11. A non-transitory computer readable storage medium having stored thereon a computer readable dataset description of an integrated circuit that, when processed, causes a processing system to generate a processor, the generated processor having hardware circuitry configured to:
    receive an input n-bit number;
    map each bit of the input n-bit number into a finite polynomial ring defined by a generator polynomial to generate n encoded values;
    multiply groups of encoded values together within the finite polynomial ring using a tree of multiplier circuits to generate a plurality of intermediate results;
    multiply groups of intermediate results together within the finite polynomial ring using the tree of multiplier circuits to generate a reduced number of intermediate results and repeating the multiplication until a single output result is generated; and
    map the single output result from the finite polynomial ring to a binary value.

* * * * *